(12) United States Patent
Shimomura et al.

(10) Patent No.: US 6,231,782 B1
(45) Date of Patent: May 15, 2001

(54) REFRIGERATOR OIL COMPOSITION

(75) Inventors: Yuji Shimomura; Satoshi Suda; Hiroyuki Hirano, all of Yokohama (JP)

(73) Assignee: Nippon Mitsubishi Oil Corp., Tokyo (JP)

( * ) Notice: Subject to any disclaimer, the term of this patent is extended or adjusted under 35 U.S.C. 154(b) by 0 days.

(21) Appl. No.: 09/377,487

(22) Filed: Aug. 20, 1999

(30) Foreign Application Priority Data

Mar. 26, 1999 (JP) .................................................. 11-083864

(51) Int. Cl.$^7$ ........................................................ C09B 5/04
(52) U.S. Cl. ................................................. 252/68; 252/67
(58) Field of Search ..................................................... 252/68

(56) References Cited

U.S. PATENT DOCUMENTS 3,983,289 * 9/1976 Nishizaki et al. .

FOREIGN PATENT DOCUMENTS

| 3140A | * 7/1979 | (EP) . |
| 3-128991 | 5/1991 | (JP) . |
| 8-134481 | 5/1996 | (JP) . |
| 9-221690 | 8/1997 | (JP) . |
| WO 90/12849 | 11/1990 | (WO) . |
| WO 97/21792 | 6/1997 | (WO) . |

* cited by examiner

*Primary Examiner*—Margaret Einsmann
(74) *Attorney, Agent, or Firm*—Finnegan, Henderson, Farabow, Garrett & Dunner, L.L.P.

(57) ABSTRACT

A refrigerating machine oil composition comprising:
(A) a hydrocarbon oil; and
(B) an alicyclic polycarboxylic acid ester compound having an alicyclic ring and at least two ester groups represented by formula (1) bonded to adjacent carbon atoms of the alicyclic ring:

$$—COOR^1 \qquad (1)$$

wherein $R^1$ represents a hydrocarbon group having 1–30 carbon atoms, and $R^1$ of each of the ester groups may be the same or different from each other.

12 Claims, No Drawings

REFRIGERATOR OIL COMPOSITION

BACKGROUND OF THE INVENTION

1. Field of the Invention

The present invention relates to a refrigerating machine oil composition, particularly relates to a refrigerating machine oil composition characterized in containing a hydrocarbon oil and an alicyclic polycarboxylic acid ester compound.

2. Related Background Art

Owing to the restriction of fluorocarbons for preventing ozone layer destruction and prevention of global warming, efforts are being made to replace chlorine-containing refrigerants such as CFC (chlorofluorocarbon) and HCFC (hydrochlorofluorocarbon) with HFC (hydrofluorocarbon), and to realize high efficiency of a refrigerating system. On the other hand, since HFC refrigerants are also the objects under the restriction for preventing global warming, the application of natural refrigerants such as carbon dioxide, ammonia, hydrocarbons have been researched.

In accordance with the efforts to substitute the above-mentioned refrigerants for the conventional refrigerants, various refrigerating machine oils have been developed. These refrigerating machine oils must satisfy a number of performance requirements including lubricity, refrigerant miscibility, heat stability/hydrolysis resistance, electric insulating ability, low hygroscopicity and the like. Therefore, the compounds contained in the refrigerating machine oils are selected to meet the required performances on the basis of the type and the use of the refrigerants. For example, refrigerating machine oils for HFC refrigerants may contain oxygen compounds such as esters, ethers and carbonates that are miscible with the refrigerant, or they may contain alkylbenzene having inferior miscibility with the refrigerant but having excellent lubricity, heat stability and hydrolysis resistance.

In order to achieve a high efficiency of a refrigerating system, the efforts have been made to lower the viscosity of the refrigerating machine oil. The ester refrigerating machine oils, such as polyol ester obtained from the reaction between an aliphatic polyhydric alcohol and a fatty acid, are disclosed in Japanese Translation Publication No. Hei 3-505602 (JP-A 3-505602) of International Publication for Patent Application and Japanese Patent Kokai (Laid-Open) Publication No. Hei 3-128991 (JP-A 3-128991). One effective means for lowering viscosity of such kinds of ester refrigerating machine oils is to select a fatty acid having a small number of carbon atoms in its alkyl group. However, in general, an ester obtained from a fatty acid with a small alkyl group would have low heat stability and hydrolysis resistance.

Japanese Patent Kokai (Laid-Open) Publication No. Hei 9-221690 (JP-A 9-221690) discloses an alicyclic polycarboxylic acid ester which is an ester refrigerating machine oil having excellent heat stability and hydrolysis resistance. However, even the ester having this structure has not sufficient heat stability and hydrolysis resistance when the viscosity thereof is lowered.

Therefore, an ester refrigerating machine oil that has both low viscosity for obtaining a high efficiency and high heat stability/hydrolysis resistance, and can also satisfy other required performances has not be developed yet.

SUMMARY OF THE INVENTION

The present invention has been accomplished to solve the above-mentioned technical problems. Therefore, an object of the present invention is to provide a refrigerating machine oil composition having excellent lubricity, refrigerant miscibility, heat stability/hydrolysis resistance, electric insulating ability and other performances, and can achieve a high efficiency of a refrigerating system when it is used together with an HFC refrigerant or a natural refrigerant such as carbon dioxide and hydrocarbon.

As the results of intensive researches conducted by the present inventors to achieve the above described object, it is found that an excellent refrigerating machine oil composition having the above-mentioned various performances can be obtained by blending a specific ester oil into a hydrocarbon oil.

The refrigerating machine oil composition according to the present invention comprises (A) a hydrocarbon oil and (B) an alicylic polycarboxylic acid ester compound having an alicyclic ring and at least two ester groups represented by formula (1) bonded to adjacent carbon atoms of the alicyclic ring:

—COOR¹ (1)

wherein $R^1$ represents a hydrocarbon group having 1–30 carbon atoms, and $R^1$ of each of the ester groups may be the same or different from each other.

In the refrigerating machine oil composition according to the present invention, the hydrocarbon oil is preferably at least one oil selected from a group consisting of mineral oils, olefin polymers, naphthalene compounds and alkylbenzenes; among which alkylbezenes are more preferable.

The alicylic polycarboxylic acid ester compound has preferably two ester groups represented by the formula (1).

The refrigerating machine oil composition according to the present invention preferably further comprises an epoxy compound and/or a phosphorus compound. The epoxy compound is preferably at least one compound selected from a group consisting of phenylglycidyl ether epoxy compounds, glycidyl ester epoxy compounds, alicyclic epoxy compounds and epoxidized fatty acid monoesters, among which glycidyl ester epoxy compounds and/or alicyclic epoxy compounds are more preferable.

A fluid composition for refrigerating machines according to the present invention comprises the above-described refrigerating machine oil composition according to the present invention and a chlorine-free fluorocarbon.

DESCRIPTION OF THE PREFFERRED EMBODIMENTS

The best modes for carrying out the present invention will be explained in detail hereinafter.

The component (A), i.e., the hydrocarbon oil in the refrigerating machine oil composition according to the present invention is an oil selected from a group consisting of mineral oils, olefin polymers, naphthalene compounds and alkylbenzenes; or a mixture of two or more kinds of these oils.

The mineral oil used in the present invention may be selected from paraffin mineral oils or naphthene mineral oils obtained by employing one or more suitably combined refining means such as solvent deasphalting, solvent extraction, hydrogenolysis, solvent dewaxing, catalyst dewaxing, hydrofinishing, sulfuric acid washing and clay treatment to treat lubricant oil fractions obtained from the atmospheric distillation and vacuum distillation of paraffin base crude oil, intermediate base crude oil or naphthene base crude oil.

Among the above-mentioned mineral oils, those highly refined are preferable due to their excellent heat stability.

The non-aromatic unsaturated parts (unsaturation) in the highly refined mineral oils used in the present invention is preferably 10% or less. When the unsaturation exceeds 10%, it probably causes the generation of sludge and the clogging of capillaries. Therefore, the unsaturation in the present invention is more preferably not more than 5%, furthermore preferably not more than 1%, and the most preferably not more than 0.1%. The examples of the highly refined mineral oils used in the present invention include refined oils obtained by using conventional means to refine the distillate oils from the atmospheric distillation or the combination of atmospheric distillation and then vacuum distillation of paraffin base crude oil, intermediate base crude oil or naphthene base crude oil; deeply dewaxed oils obtained by further deep dewaxing after the refining; and hydrogenated oils obtained by further hydrogenation. Various refining method scan be used in this case without any specific restriction.

In general, (a) hydrogenation, (b) dewaxing (solvent dewaxing or hydrogenation dewaxing), (c) solvent extraction, (d) alkali washing or sulfuric acid washing, and (e) clay treatment can be carried out singly or in combination in a suitable order. It is also effective to divide a single treatment into several stages and carry it out repeatedly. For example, the distillate oil can be refined by (i) hydrogenation, or further alkali washing or sulfuric acid washing after the hydrogenation; (ii) hydrogenation and then dewaxing; (iii) solvent extraction and then hydrogenation; (iv) hydrogenation divided into two or three stages, or further alkali washing or sulfuric acid washing after the hydrogenation; or (v) re-dewaxing treatment after undergoing one of the foregoing (i) to (iv) treatments, thus obtaining a deeply dewaxed oil.

Naphthene mineral oils and mineral oils obtained by the deeply dewaxing treatment are preferable as the highly refined mineral oils used in the present invention in the viewpoint of having low temperature fluidity and without wax precipitation at a low temperature. The deeply dewaxing is carried out by means of solvent dewaxing or catalyst dewaxing using zeolite catalyst under severe conditions.

The examples of olefin polymers include the polymers of olefins having 2–12 carbon atoms and hydrogenated polymers of olefins having 2–12 carbon atoms. For example, polybutenes, polyisobutenes, oligomers of α-olefins with 5–12 carbon atoms (poly-α-olefins), ethylene-propylene copolymers and their hydrogenated products are preferable.

The preparation methods of the olefin polymers can be various known methods without any specific restriction. For example, poly-α-olefin may be prepared by using an α-olefin produced from ethylene as a raw material, and polymerizing the same with known methods such as Ziegler catalysis, radical polymerization, aluminium chloride method, boron fluoride method or the like.

There is no particular restriction on the naphthalene compound provided that it has a naphthalene skeleton. However, when consideration is given to its miscibility with the refrigerant, the naphthalene compound preferably has 1 to 4 alkyl groups, each alkyl group having 1 to 10 carbon atoms and the total number of carbon atoms in all the alkyl groups being 1 to 10; and more preferably has 1 to 3 alkyl groups, each alkyl group having 1 to 8 carbon atoms and the total number of carbon atoms in all the alkyl groups being 3 to 8.

The examples of the alkyl groups having 1 to 10 carbon atoms include methyl group, ethyl group, n-propyl group, isopropyl group, straight or branched chain butyl group, straight or branched chain pentyl group, straight or branched chain hexyl group, straight or branched chain heptyl group, straight or branched chain octyl group, straight or branched chain nonyl group and straight or branched chain decyl group.

The naphthalene compound may be a compound having a single structure or a mixture of two or more compounds.

The preparation methods of the foregoing naphthalene compounds can be various known methods without any specific restriction. For example, the naphthalene compounds can be prepared by adding halides of hydrocarbons having 1–10 carbon atoms, olefins having 2–10 carbon atoms or styrenes having 8–10 carbon atoms to naphthalene in the presence of a mineral acid (sulfuric acid, phosphoric acid, tungstosilicic acid, hydrofluoric acid, etc.), a solid acidic substance such as acid clay or activatd clay, and an acidic catalyst such as Friedel-Crafts catalyst which is a metal halide (aluminium chloride, zinc chloride, etc.).

There is no particular restriction on alkylbenzene. However, in order to obtain an excellent miscibility with the refrigerant, the alkylbenzene preferably has 1 to 4 alkyl groups, each alkyl group having 1 to 40 carbon atoms and the total number of carbon atoms in all the alkyl groups being 1 to 40; and more preferably has 1 to 4 alkyl groups, each alkyl group having 1 to 30 carbon atoms and the total number of carbon atoms in all the alkyl groups being 3 to 30.

The examples of the alkyl groups having 1 to 40 carbon atoms include methyl group, ethyl group, n-propyl group, isopropyl group, straight or branched chain butyl group, straight or branched chain pentyl group, straight or branched chain hexyl group, straight or branched chain heptyl group, straight or branched chain octyl group, straight or branched chain nonyl group, straight or branched chain decyl group, straight or branched chain undecyl group, straight or branched chain dodecyl group, straight or branched chain tridecyl group, straight or branched chain tetradecyl group, straight or branched chain pentadecyl group, straight or branched chain hexadecyl group, straight or branched chain heptadecyl group, straight or branched chain octadecyl group, straight or branched chain nonadecyl group, straight or branched chain icosyl group, straight or branched chain henicosyl group, straight or branched chain docosyl group, straight or branched chain tricosyl group, straight or branched chain tetracosyl group, straight or branched chain pentacosyl group, straight or branched chain hexacosyl group, straight or branched chain heptacosyl group, straight or branched chain octacosyl group, straight or branched chain nonacosyl group, straight or branched chain triacontyl group, straight or branched chain hentriacontyl group, straight or branched chain dotriacontyl group, straight or branched chain tritriacontyl group, straight or branched chain tetratriacontyl group, straight or branched chain pentatriacontyl group, straight or branched chain hexatriacontyl group, straight or branched chain heptatriacontyl group, straight or branched chain octatriacontyl group, straight or branched chain nonatriacontyl group, straight or branched chain tetracontyl group (including all isomers thereof), etc.

These alkyl groups may be in straight chain form or branched chain form. The straight chain alkylbenzenes are preferable when consideration is given to their compatibility with the organic material used in the refrigerating system, whereas branched chain alkyl groups are preferable when consideration is given to their miscibility with the refrigerant, heat stability, viscosity characteristic and so on, and the branched chain alkyl groups derived from the oligomers of olefin such as propylene, butene, isobutylene, etc. are more preferable since they can be obtained comparatively easily.

The alkylbenzene may be a compound having a single structure or a mixture of two or more compounds.

Although the foregoing alkylbenzene can be prepared by any methods without any specific restriction, it is in general prepared by the following synthesizing method.

An aromatic compound, for example, benzene, toluene, xylene, ethyl benzene, methylethyl benzene, diethylbenzene or a mixture thereof, is used as a raw material. The examples of the alkylating agent used in this synthesis include straight or branched chain olefins having 6–40 carbon atoms obtained by the polymerization of lower monoolefins such as ethylene, propylene, butene, isobutylene or the like (preferably propylene); straight or branched chain olefins having 6–40 carbon atoms obtained by the pyrolysis of waxes, heavy oils, petroleum fractions, polyethylenes, polypropylenes, etc.; straight chain olefins having 9–40 carbon atoms obtained by separating n-paraffin from petroleum fractions such as kerosine or light oil and using a catalyst to change the n-paraffin into olefins; and the mixtures of the foregoing olefins.

The alkylating catalyst used in alkylation may be a known catalyst, for example, a Friedel-Crafts catalyst such as aluminium chloride, zinc chloride, etc.; an acidic catalyst such as sulfuric acid, phosphoric acid, tungstosilicic acid, hydrofluoric acid, activated clay, etc.; or the like.

The component (A), hydrocarbon oil, in the refrigerating machine oil composition according to the present invention can be any of the above-described oils, among which alkylbenzen is particularly preferable when consideration is given to its oil returning property. Further, it is natural that two or more kinds of above-described hydrocarbon oils may be used in combination.

The component (B) according to the present invention is an alicylic polycarboxylic acid ester compound having an alicyclic ring and at least two ester groups represented by formula (1) bonded adjacent carbon atoms of the alicyclic ring:

$$-COOR^1 \qquad (1)$$

wherein $R^1$ represents a hydrocarbon group having 1–30 carbon atoms, and $R^1$ of each of the ester groups may be the same or different from each other.

Here, the examples of the alicyclic ring include cyclopentane ring, cyclopentene ring, cyclohexane ring, cyclohexene ring, cycloheptane ring, cycloheptene ring, etc., among which cyclohexane ring and cyclohexene ring are preferable. Further, cyclohexane ring is preferable since the rise of its viscosity is small in the use for a long term or under severe conditions, whereas cyclohexene ring is preferable since the rise of its total acid value is small in the use for a long term or under severe conditions.

In addition to the alicyclic ring, the (B) alicyclic polycarboxylic acid ester compound must have at least two ester groups represented by formula (1). The carboxylic acid ester compound only having one ester group is not preferable since its miscibility with the refrigerant and heat stability/hydrolysis resistance are insufficient. Further, there is no particular restriction on the number of the ester groups, however, when taking into consideration the low temperature fluidity, it preferably has 4 or less, more preferably 3 or less, and the most preferably 2 ester groups.

Further, the at least two ester groups represented by formula (1) must be bonded to adjacent carbon atoms of the alicyclic ring. The carboxylic acid ester compound, wherein the ester groups are not bonded to adjacent carbon atoms of the alicyclic ring, is not preferable since its heat stability/hydrolysis resistance is insufficient.

There is no particular restriction on the stereo configuration of the ester groups. For example, if the carboxylic acid ester compound has two ester groups represented by formula (1), these two ester groups may be in cis- or trans-form. However, when consideration is given to heat stability and hydrolysis resistance, cis-form is preferable, whereas when consideration is given to both heat stability/hydrolysis resistance and lubricity, trans-form is preferable.

$R^1$ in formula (1) is a hydrocarbon group having 1–30, preferably 2–24 and more preferably 3–18 carbon atoms. The hydrocarbon group mentioned here includes alkyl groups, alkenyl groups, cycloalkyl groups, alkyl cycloalkyl groups, aryl groups, alkyl aryl groups, aryl alkyl groups and so on. Among these groups, alkyl groups, cycloalkyl groups and alkyl cycloalkyl groups are preferable due to their high heat stability and hydrolysis resistance.

The alkyl groups may be straight or branched chain alkyl groups. The examples of the alkyl groups having 3 to 18 carbon atoms include straight or branched chain propyl group, straight or branched chain butyl group, straight or branched chain pentyl group, straight or branched chain hexyl group, straight or branched chain heptyl group, straight or branched chain octyl group, straight or branched chain nonyl group, straight or branched chain decyl group, straight or branched chain undecyl group, straight or branched chain dodecyl group, straight or branched chain tridecyl group, straight or branched chain tetradecyl group, straight or branched chain pentadecyl group, straight or branched chain hexadecyl group, straight or branched chain heptadecyl group, straight or branched chain octadecyl group, etc.

For the straight chain alkyl groups, those having 5 or more carbon atoms are preferable from the point of heat stability and hydrolysis resistance, whereas those having 18 or less carbon atoms are preferable from the point of refrigerant miscibility. Further, for the branched chain alkyl groups, those having 3 or more carbon atoms are preferable from the point of heat stability and hydrolysis resistance, whereas those having 18 or less carbon atoms are preferable from the point of refrigerant miscibility.

The examples of the cycloalkyl groups include cyclopenthyl group, cyclohexyl group, cycloheptyl group and the like, among which, cyclohexyl group is preferable from the point of heat stability/hydrolysis resistance. As to the alkyl cycloalkyl groups wherein an alkyl group is bonded to a cycloalkyl group, a group wherein an alkyl group is bonded to a cyclohexyl group is preferable from the point of heat stability/hydrolysis resistance. Furthermore, the alkyl cycloalkyl groups each having 6 or more carbon atoms are preferable from the point of heat stability and hydrolysis resistance, whereas those each having 10 or less carbon atoms are preferable from the points of refrigerant miscibility and low temperature fluidity.

Furthermore, as a matter of course (B) alicyclic polycarboxylic acid ester compound may have one or more hydrocarbon groups bonded to carbon atoms of its alicyclic ring. Such hydrocarbon groups are preferably alkyl groups, and particularly preferably methyl group.

The component (B), alicyclic polycarboxylic acid ester compound, according to the present invention having the above-described structure is prepared by employing a conventional method to esterifying predetermined acid and alcohol components preferably in the atmosphere of an inert gas such as nitrogen, or in the atmosphere of an esterification catalyst, or by heating the reactants without the catalyst. Here, the compounds obtained from the esterification without using any catalyst are preferably from the viewpoints of heat stability/hydrolysis resistance and electric insulating ability.

The acid component for (B) alicyclic polycarboxylic acid ester compound may be a cycloalkane polycarboxylic acid, a cycloalkene polycarboxylic acid, or an acid anhydride thereof that can form an ester compound having at least two ester groups bonded to the adjacent carbon atoms of the alicyclic ring. These acid components can be used singly or jointly as a mixture including two or more of said acids. For example, 1,2-cyclohexanedicarboxylic acid, 4-cyclohexene-1,2-dicarboxylic acid, 1-cyclohexene-1,2-dicarboxylic acid, 3-methyl-1,2-cyclohexanedicarboxylic acid, 4-methyl-1,2-cyclohexanedicarboxylic acid, 3-methyl-4-cyclohexene-1,2-dicarboxylic acid, 4-methyl-4-cyclohexene-1,2-dicarboxylic acid, 1,2,4-cyclohexane tricarboxylic acid, 1,2,4,5-cyclohexane tetracarboxylic acid and acid anhydrides thereof are disclosed. Among these acids, 1,2-cyclohexanedicarboxylic acid, 3-methyl-1,2-cyclohexanedicarboxylic acid, 4-methyl-1,2-cyclohexanedicarboxylic acid, 1,2,4-cyclohexane tricarboxylic acid, 1,2,4,5-cyclohexane tetracarboxylic acid and the acid anhydrides thereof are preferable from the viewpoint of restraining the rise of viscosity when the ester compounds prepared from these acids are used for a long term or under severe conditions. On the other hand, 4-cyclohexene-1,2-dicarboxylic acid, 1-cyclohexene- 1,2-dicarboxylic acid, 4-methyl-1,2-cyclohexanedicarboxylic acid, 3-methyl-4-cyclohexene-1,2-dicarboxylic acid, 4-methyl-4-cyclohexene-1,2-dicarboxylic acid and the acid anhydrides thereof are preferable from the viewpoint of restraining the rise of total acid value in the use for a long term or under severe conditions.

There is no particular limit to the method for preparing the alicyclic polycarboxylic acids and the acid anhydrides thereof, and the acids or the acid anhydrides obtained by any method can be used. For example, cis-4-cyclohexene-1,2-dicarboxylic acid can be obtained from the reaction between butadiene and maleic acid anhydride in a benzene solvent at 100° C.

The alcohol component of (B) alicyclic polycarboxylic acid ester compound may be selected from straight chain alcohols having 3–18 carbon atoms, branched chain alcohols having 3–18 carbon atoms, and cycloalcohols having 5–10 carbon atoms, for example, straight or branched chain propanol (n-propanol, 1-methylethanol, etc.), straight or branched chain butanol (n-butanol, 1-methylpropanol, 2-methylpropanol, etc.), straight or branched chain pentanol (n-pentanol, 1-methylbutanol, 2-methylbutanol, 3-methylbutanol, etc.), straight or branched chain hexanol (n-hexanol, 1-methylpentanol, 2-methylpentanol, 3-methylpentanol, etc.), straight or branched chain heptanol (n-heptanol, 1-methylhexanol, 2-methylhexanol, 3-methylhexanol, 4-methylhexanol, 5-methylhexanol, 2,4-dimethylpentanol, etc.), straight or branched chain octanol (n-octanol, 2-ethylhexanol, 1-methylheptanol, 2-methylheptanol, etc.), straight or branched chain nonanol (n-nonanol, 1-methyloctanol, 3,5,5-trimethylhexanol, 1-(2'-methylpropyl)-3-methylbutanol, etc.), straight or branched chain decanol (n-decanol, iso-decanol, etc.), straight or branched chain undecanol (n-undecanol, etc.), straight or branched chain dodecanol (n-dodecanol, iso-dodecanol, etc.), straight or branched chain tridecanol, straight or branched chain tetradecanol (n-tetradecanol, iso-tetradecanol, etc.), straight or branched chain pentadecanol, straight or branched chain hexadecanol (n-hexadecanol, iso-hexadecanol, etc.), straight or branched chain heptadecanol, straight or branched chain octadecanol (n-octadecanol, iso-octadecanol, etc.), cyclohexanol, methylcyclohexanol, dimethylcyclohexanol, etc.

The amount of the alcohol component in the esterification is, for example, 1.0 to 1.5 equivalencies, preferably 1.05 to 1.2 equivalencies with respect to 1 equivalency of acid.

Further, the alicyclic polycarboxylic acid ester compound can also be obtained by transesterification using lower alcohol ester of the above-mentioned acids and/or acetic esters or propionic esters of corresponding alcohols instead of the above-mentioned acid and alcohol components.

The examples of the esterification catalysts include Lewis acids (e.g., aluminum derivatives, tin derivatives, titanium derivatives, etc.); alkali metal salts (e.g., sodium alkoxides, potassium alkoxides, etc.); and sulfonic acids (e.g., para-toluenesulfonic acid, methanesulfonic acid, sulfuric acid, etc.). The amount of the catalyst to be used is, for example, about 0.1 to 1% by mass of the total amount of the raw materials including the acid and alcohol components.

The temperature for esterification is, for example, 150° C. to 230° C., and the time for completing the reaction is generally 3 to 30 hours.

After the esterification, the excessive raw materials are removed by vacuum distillation or atmospheric distillation. Subsequently, the ester compound is refined with a conventional refining method such as liquid-liquid extraction, vacuum distillation, or adsorption refining methods such as activated carbon treatment.

Further, the alicyclic polycarboxylic acid ester compound according to the present invention can also be obtained by the nuclear-hydrogenation of a corresponding aromatic polycarboxylic acid ester compound.

Although there is no particular restriction on the contents of components (A) hydrocarbon oil and (B) alicyclic polycarboxylic acid ester compound in the refrigerating machine oil composition according to the present invention, in general, the content of (A) hydrocarbon oil is within a range of 5 to 95% by mass, and the content of (B) alicyclic polycarboxylic acid ester compound is within a range of 5 to 95% by mass, of the total amount of the refrigerating machine oil composition.

However, when taking into consideration the lubricity, the heat stability/hydrolysis resistance and the electric insulating ability of the composition, the contents of (A) hydrocarbon oil and (B) alicyclic polycarboxylic acid ester compound are preferable 10% by mass or more and 90% by mass or less, respectively; more preferably 30% by mass or more and 70% by mass or less, respectively; and most preferably 40% by mass or more and 60% by mass or less, respectively.

On the other hand, when taking into consideration the miscibility with the refrigerant, the contents (A)hydrocarbon oil and (B) alicyclic polycarboxylic acid ester compound are preferable 90% by mass or less and 10% by mass or more, respectively; more preferably 70% by mass or less and 30% by mass or more, respectively; and most preferably 60% by mass or less and 40% by mass or more, respectively.

The refrigerating machine oil composition comprising (A) a hydrocarbon oil and (B) an alicyclic polycarboxylic acid ester compound according to the present invention may also be used in combination with an oxygen-containing synthetic oil such as esters other than the component (B), polyglycols, polyvinyl ethers, ketones, polyphenyl ethers, silicone, polysiloxanes, or perfluoro ethers. The preferable ones among the above-listed oxygen-containing synthetic oils are esters other than the component(B), polyglycols, polyvinyl ethers and ketones.

The refrigerating machine oil composition according to the present invention comprises (A) a hydrocarbon oil, (B) an alicyclic polycarboxylic acid ester compound and, if required, the oxygen-containing synthetic oil. There is no particular restriction on the amount of the oxygen-containing synthetic oil to be incorporated into the refrigerating machine oil composition. However, in order to improve thermal efficiency and attain heat stability/hydrolysis resistance of the refrigerating machine oil, the content of the oxygen-containing synthetic oil is preferably not more than 150 parts by weight and more preferably not more than 100 parts by weight with respect to 100 parts by weight of the mixed oil including the hydrocarbon oil and the alicyclic polycarboxylic acid ester compound.

The refrigerating machine oil composition according to the present invention comprising (A) a hydrocarbon oil, (B) an alicyclic polycarboxylic acid ester compound and, if required, the oxygen-containing synthetic oil is principally used as a base oil. The refrigerating machine oil composition according to the present invention can be used preferably without any additive or used in combination with various kinds of additives according to necessity.

In order to further improve the wear resistance and load capacity, the refrigerating machine oil composition according to the present invention may further comprise at least one phosphorus compound selected from a group consisting of phosphoric esters, acidic phosphoric esters, amine salts of acidic phosphoric esters, chlorinated phosphoric esters and phosphorous esters. These phosphorus compounds are esters of phosphoric acid or phosphorous acid and an alkanol or a polyether type alcohol; or are derivatives thereof.

Specifically, the phosphoric esters include, for example, tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylyl phosphate, cresyl diphenyl phosphate, xylyl diphenyl phosphate and the like. The acidic phosphoric esters include, for example, monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, dioleyl acid phosphate and the like. The amine salts of acidic phosphoric esters include, for example, salts of the above acidic phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. The chlorinated phosphoric esters include, for example, tris dichloropropyl phosphate, tris chloroethyl phosphate, tris chlorophenyl phosphate, polyoxyalkylene bis[di(chloroalkyl)]phosphate and the like. The phosphorous esters include, for example, dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, tricresyl phosphite and the like. The mixtures of the above compounds can be used.

In a case where these phosphorus compounds are incorporated into the refrigerating machine oil composition according to the present invention, the amount of the phosphorus compounds to be incorporated is not particularly limited, whereas in general the content of the incorporated phosphorus compound is preferably within a range of 0.01 to 5.0% by mass and more preferably within a range of 0.02 to 3.0% by mass, of the total amount of the refrigerating machine oil composition (i.e., the total amount of the base oil and all incorporated additives).

Further, in order to further improve the heat stability and hydrolysis resistance, the refrigerating machine oil composition according to the present invention may further comprise at least one epoxy compound selected from a group consisting of:

(1) phenylglycidyl ether epoxy compounds,
(2) alkylglycidyl ether epoxy compounds,
(3) glycidyl ester epoxy compounds,
(4) aryl oxirane compounds,
(5) alkyl oxirane compounds,
(6) alicyclic epoxy compounds,
(7) epoxidized fatty acid monoesters, and
(8) epoxidized vegetable oils.

(1) Phenylglycidyl ether epoxy compounds can concretely exemplified by phenylglycidyl ether or alkylphenylglycidyl ethers. The alkylphenylglycidyl ethers mentioned here include, for example, those having 1 to 3 alkyl groups each having 1 to 13 carbon atoms, among which those having one alkyl group with 4 to 10 carbon atoms, for example, n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether, decylphenylglycidyl ether and the like are preferable.

(2) Alkylglycidyl ether epoxy compounds can be concretely exemplified by decylglycidyl ether, undecylglycidyl ether, dodecylglycidyl ether, tridecylglycidyl ether, tetradecylglycidyl ether, 2-ethylhexylglycidyl ether, neopentylglycoldiglycidyl ether, trimethylolpropanetriglycidyl ether, pentaerythritoltetraglycidyl ether, 1,6-hexanedioldiglycidyl ether, sorbitolpolyglycidyl ether, polyalkyleneglycolmonoglycidyl ether, polyalkyleneglycoldiglycidyl ether and the like.

(3) Glycidyl ester epoxy compounds can be concretely exemplified by the compounds represented by formula (2):

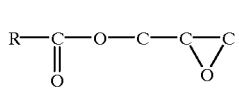

(2)

wherein R is a hydrocarbon group having 1 to 18 carbon atoms.

In formula (2), the hydrocarbon group having 1–18 carbon atoms represented by R is, for example, an alkyl group having 1–18 carbon atoms; an alkenyl group having 2–18 carbon atoms; a cycloalkyl group having 5–7 carbon atoms; an alkylcycloalkyl group having 6–18 carbon atoms; an aryl group having 6–10 carbon atoms; an alkylaryl group having 7–18 carbon atoms; and an arylalkyl group having 7–18 carbon atoms, among which an alkyl group having 5–15 carbon atoms; an alkenyl group having 2–15 carbon atoms; a phenyl group; and an alkylphenyl group having an alkyl group having 1–4 carbon atoms are preferable.

The preferable examples of glycidyl ester epoxy compounds include glycidyl-2,2-dimethyloctanoate, glycidyl benzoate, glycidyl-tert-butyl benzoate, glycidyl acrylate, glycidyl methacrylate and the like.

(4) Aryl oxirane compounds can be concretely exemplified by 1,2-epoxy styrene, alkyl-1,2-epoxy styrene.

(5) Alkyl oxirane compounds can be concretely exemplified by 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, 1,2-epoxyicosane and the like.

(6) Alicyclic epoxy compounds are represented by formula (3) wherein the carbon atoms forming an epoxy group directly constitute an alicyclic ring:

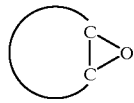

(3)

Alicyclic epoxy compounds can be concretely exemplified by 1,2-epoxycyclohexane, 1,2-epoxycyclopentane, 3,4-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]) heptane, 4-(1'-methylepoxyethyl)-1,2-epoxy-2-methylcyclohexane, 4-epoxyethyl-1,2-epoxycyclohexane and the like.

(7) Epoxidized fatty acid monoesters can be concretely exemplified by the esters of an epoxidized fatty acid having 12 to 20 carbon atoms and a phenol, an alkylphenol or an alcohol having 1 to 8 carbon atoms. In particular, butyl, hexyl, benzyl, cyclohexyl, methoxyethyl, octyl, phenyl and butylphenyl esters of epoxidized stearic acid are preferably used.

(8) Epoxidized vegetable oil can be concretely exemplified by the epoxy compounds of vegetable oils such as soybean oil, linseed oil, cotton seed oil and the like.

In order to further improving heat stability and hydrolysis resistance, the preferable ones among the above-listed epoxy compounds are phenylglycidyl ether epoxy compounds, glycidyl ester epoxy compounds, alicyclic epoxy compounds and epoxidized fatty acid monoesters, among glycidyl ester epoxy compounds and alicyclic epoxy compounds are more preferable.

When these epoxy compounds are incorporated into the refrigerating machine oil composition according to the present invention, the amount of the epoxy compounds to be incorporated is not particularly limited, whereas in general the content of the incorporated epoxy compounds is preferably within a range of 0.1 to 5.0% by mass and more preferably within a range of 0.2 to 2.0% by mass, of the total amount of the refrigerating machine oil composition (i.e., the total amount of the base oil and all incorporated additives).

As a matter of course, two or more kinds of above described phosphorus compounds and epoxy compounds may be used jointly.

In order to further improve the wear resistance and load capacity, a sulfur-containing additive can be incorporated into the refrigerating machine oil composition according to the present invention. The example of such a sulfur additive include phosphorothionates, sulfides, thiocarbonates and zinc thiophosphates.

Phosphorothionates are represented by formula (4)

wherein each $R^2$ represents an alkyl group, an aryl group or a phenyl group, $R^2$ may be the same or different from each other.

Such phosphorothionates include, for example, trialkylphosphorothionates, triphenylphosphorothionate, alkyldiarylphosphorothionates, etc.

Sulfides include, for example, diphenylsulfide, diphenyldisulfide, di-n-butylsulfide, di-n-butyldisulfide, di-tert-dodecyldisulfide, di-tert-dodecyl trisulfide and the like. Thiocarbonates include, for example, xanthic disulfide. Zinc thiophosphates include, for example, zinc primary alkylthiophosphate, zinc secondary alkylthiophospahte, zinc arylthiophosphate and the like.

Among the above-mentioned sulfur additive, phosphorothionates are preferable from the viewpoints of wear resistance, load capacity and heat stability/hydrolysis resistance, and among the phosphorothionates, triphenylphosphorothionate is the most preferable.

When the sulfur additive is incorporated into the refrigerating machine oil composition according to the present invention, the amount of the sulfur additive to be incorporated is not particularly limited, whereas, when the consideration is given to wear resistance and load capacity, the amount of the sulfur additive is preferably not less than 0.1% by mass, more preferably not less than 0.5% by mass, and further more preferable not less than 1.0% by mass, of the total amount of the refrigerating machine oil composition (i.e., the total amount of the base oil and all incorporated additives). Further, when the consideration is given to the heat stability/hydrolysis resistance, the amount of sulfur additive to be incorporated is preferably not more than 50% by mass, more preferably not more than 30% by mass, and further more preferable not more than 10% by mass.

Further, in order to improve the performances, the refrigerating machine oil composition according to the present invention may be incorporated, as required, with heretofore known additives for a refrigerating machine oil, for example, phenol-type antioxidants such as di-tert-butyl-p-cresol and bisphenol A; amine-type antioxidants such as phenyl-a-naphthylamine and N,N-di(2-naphthyl)-p-phenylenediamine; extreme pressure agents such as chlorinated paraffin; oiliness improvers such as fatty acids; antifoaming agents such as silicone-type ones; metal inactivators such as benzotriazole; viscosity index improvers; pour-point depressants; detergent dispersants and so on. These additives may be incorporated into the refrigerating machine oil singly or jointly. The total amount of the additives added into the refrigerating machine oil is not particularly limited, whereas in general the content thereof is preferably not more than 10% by mass and more preferably not more than 5% by mass, of the total amount of the refrigerating machine oil composition (i.e., the total amount of the base oil and all incorporated additives).

The kinematic viscosity of the refrigerating machine oil of the present invention is not particularly limited, whereas the kinematic viscosity at 40° C. can preferably be within a range of 3 to 100 mm$^2$/s, more preferably 4 to 50 mm$^2$/s and the most preferably 5 to 40 mm$^2$/s. Further, the kinematic viscosity at 100° C. can preferably be within a range of 1 to 20 mm$^2$/s and more preferably 2 to 10 mm$^2$/s. Further, one of the effects achieved by the present invention is that good heat stability/hydrolysis resistance can be obtained even when an ester having a low viscosity is used. Such effect is more remarkably achieved in the case where the kinematic viscosity at 40° C. is preferably within a range of 5 to 35 mm$^2$/s, more preferably 5 to 25 mm$^2$/s, furthermore preferably 5 to 20 mm$^2$/s, and the most preferably 5 to 15 mm$^2$/s.

Further, the volume resistivity of the refrigerating machine oil composition according to the present invention is not particularly limited, whereas it can preferably be not less than $1.0 \times 10^{11}$ Ω·cm, more preferably not less than $1.0 \times 10^{12}$ Ω·cm and the most preferably not less than $1.0 \times 10^{13}$ Ω·cm. Particularly, when the refrigerating machine oil composition is used for a hermetic type refrigerating machine, high electric insulating ability tends to become requisite. In the present invention, the volume resistivity is represented by the value at 25° C. measured in accordance with JIS C 2101 "Electric Insulating Oil Testing Method."

The content of water in the refrigerating machine oil composition according to the present invention is not particularly limited, whereas it can preferably be 200 ppm or less, more preferably 100 ppm or less, and the most preferably 50 ppm or less, of the total amount of the refrigerating machine oil composition. Particularly, when the refrigerating machine oil composition is used for a hermetic type refrigerating machine, a low water content is required due to its effects on the heat stability/hydrolysis resistance and electric insulating ability of the oil.

Further, the total acid value of the refrigerating machine oil composition according to the present invention is not particularly limited. However, when the oil composition is used in a refrigerating machine or pipes for preventing metals from corrosion, the total acid value can preferably be 0.1 mgKOH/g or less, and more preferably 0.05 mgKOH/g or less. In the present invention, the total acid value is represented by the value of the total acid value measured in accordance with JIS C 2501 "Petroleum Products and Lubricating Oils—Neutralization Value Testing Method".

The content of ash in the refrigerating machine oil composition according to the present invention is not particularly limited, whereas, in order to improve the heat stability/hydrolysis resistance of the oil and suppress the generation of sludge or the like, it can preferably be 100 ppm or less, and more preferably 50 ppm or less. In the present invention, the ash content is represented by the value of the ash content measured in accordance with JIS C 2272 "Testing Method for Ash Content and Sulfuric Acid Ash Content in Crude Oil and Petroleum Product".

The refrigerants to be used in the refrigerating machine wherein the refrigerating machine oil composition according to the present invention is used may be HFC refrigerants, fluorine-containing ether refrigerants such as perfluoroethers; fluorine-free ether refrigerants such as dimethyl ethers; and natural refrigerants such as carbon dioxide, hydrocarbons and so on. The refrigerants can be used singly or jointly as a mixture including two or more kinds of the refrigerants.

HFC refrigerants are, for example, hydrofluocarbons having 1–3 and preferably 1 or 2 carbon atoms, for example, difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) or a mixture of two or more kinds of these HFCs. The refrigerant is selected in accordance with the use and the requisite performances. For example, single HFC-32; single HFC-23; single HFC-134a; single HFC-125, a mixture of HFC-134a/HFC-32=60–80% by mass/40–20% by mass; a mixture of HFC-32/HFC-125=40–70% by mass/60–30% by mass; a mixture of HFC-125/HFC-143a=40–60% by mass/60–40% by mass; a mixture of HFC-134a/HFC-32/HFC-125=60% by mass/30% by mass/10% by mass; a mixture of HFC-134a/HFC-32/HFC-125=40–70% by mass/15–35% by mass/5–40% by mass; and a mixture of HFC-125/HFC-134a/HFC-143a=35–55% by mass/1–15% by mass/40–60% by mass are preferable. More specific examples include a mixture of HFC-134a/HFC-32=70/30% by mass, a mixture of HFC-32/HFC-125=60/40% by mass; a mixture of HFC-32/HFC-125=50/50% by mass (R410A); a mixture of HFC-32/HFC-125=45/55% by mass (R410B); a mixture of HFC-125/HFC-143a=50/50% by mass (R507C); a mixture of HFC-32/HFC-125/HFC-134a=30/10/60% by mass; a mixture of HFC-32/HFC-125/HFC-134a=23/25/52% by mass (R407C); a mixture of HFC-32/HFC-125/HFC-134a=25/15/60% by mass (R407E); and a mixture of HFC-125/HFC-134a/HFC-143a=44/4/52% by mass (R404A).

Further, the example of the natural refrigerants include carbon dioxide, hydrocarbons and so on. The hydrocarbon refrigerant used here is preferably a gas at 25° C. under 1 atm, for example, alkane, cycloalkane or alkene having 1 to 5 carbon atoms and preferably 1 to 4 carbon atoms or a mixture thereof. The examples of the hydrocarbon refrigerant include methane, ethylene, ethane, propylene, propane, cyclopropane, butane, isobutane, cyclobutane, methylcyclopropane and the mixtures of two or more kinds of these compounds, among which propane, butane, isobutane and the mixtures thereof are preferable.

The refrigerating machine oil composition according to the present invention normally exists in the form of a fluid composition for a refrigerating machine mixed with a refrigerant as describe above when it is used in the refrigerating machine. The ratio of the refrigerating machine oil composition to the refrigerant is not particularly limited, whereas the amount of the refrigerating machine oil composition is preferably within a range of 1 to 500 parts by weight and more preferably within a range of 2 to 400 parts by weight per 100 parts by weight of the refrigerant.

The refrigerating machine oil composition according to the present invention can be used as a lubricating oil for refrigerant compressors in all types of refrigerating machines, since the present refrigerating machine oil composition has excellent electric characteristic and a low hygroscopicity. Such refrigerating machines in which the present refrigerating machine oil composition is used can be concretely exemplified by an air conditioner for rooms, a package air conditioner, a cold-storage chest (refrigerator), an air conditioner for vehicles, a dehumidifier, a freezer, a freeze and refrigeration warehouse, an automatic vending machine, a showcase, a cooling apparatus in chemical plants and so on. Further, the refrigerating machine oil composition according to the present invention is particularly preferable to be used in refrigerating machines having a hermetic compressor. Furthermore, the refrigerating machine oil composition according to the present invention can be used in all types of compressors including a reciprocating type one, a rotating type one and a centrifugal type one. Furthermore, the refrigerating machine oil composition according to the present invention can be used as a lubricating oil for the purpose of bettering the initial running-in of a sliding member in a refrigerant compressor.

EXAMPLES

The present invention will be explained in detail by the following Examples and Comparative Examples, but the present invention is not limited to these Examples.

Examples 1–58 and Comparative Examples 1–19

The following (A) hydrocarbon oil, (B) alicyclic polycarboxylic acid ester compound, other base oil components, and additives were blended in the proportions shown in Tables 1–17 to prepare sample oils of Examples 1–58 and Comparative Examples 1–19, respectively. The properties of each of the obtained sample oils are shown in Tables 1–17 (kinematic viscosities at 40° C. and 100° C., total acid value).

(A) hydrocarbon oil

Base oil 1: hard type alkylbenzene (number average molecular weight: 270)

Base oil 2: soft type alkylbenzene (number average molecular weight: 380)

Base oil 3: paraffin-based highly refined mineral oil (pour point: −50° C., aniline point: 110° C., %CA: 0.0, %CN: 36.5, %CP: 63.5, non-aromatic unsaturated part: 0.0%)

Base oil 4: naphthene-based mineral oil (pour point: −40° C., aniline point: 80° C., %CA: 10.0, %CN: 43.0, %CP: 47.0, non-aromatic unsaturated part: 0.0%)

Base oil 5: poly-a-olefin (oligomer of 1-decene, number average molecular weight: 370)

Base oil 6: alkylnaphthalene (number average molecular weight: 210)

(B) alicyclic polycarboxylic acid ester compound

Base oil 7: cis-1,2-cyclohexanedicarboxylic acid diisoheptyl

Base oil 8: cis-1,2-cyclohexanedicarboxylic acid di(2-ethylhexyl)

Base oil 9: cis-1,2-cyclohexanedicarboxylic acid di(3,5,5-trimethyl hexyl)

Base oil 10: cis-1,2-cyclohexanedicarboxylic acid di(2,6-dimethyl-4-heptyl)

Base oil 11: cis-1,2-cyclohexanedicarboxylic acid diisodecyl

Base oil 12: cis-4-cyclohexene-1,2-dicarboxylic acid diisoheptyl

Base oil 13: cis-4-cyclohexene-1,2-dicarboxylic acid di(2-ethylhexyl)

Base oil 14: cis-4-cyclohexene-1,2-dicarboxylic acid di(3,5,5-trimethylhexyl)

(Other Base Oils)

Base oil 15: tetraester of pentaerythritol and an aliphatic acid mixture consisting of 2-ethylhexanoic acid and 3,5,5-trimethylhexanoic acid (weight ratio=50:50)

Base oil 16: tetraester of pentaerythritol and an aliphatic acid mixture consisting of n-pentanoic acid, n-heptanoic acid and 3,5,5-trimethylhexanoic acid (weight ratio=50:30:20)

Base oil 17: copolymer of vinyl ethyl ether and vinyl butyl ether (ethyl/isobutyl=7:1, average molecular weight: 900)

(Additives)

Additive 1: phenylglycidyl ether

Additive 2: glycidyl-2,2-dimethyloctanoate

Additive 3: cyclohexeneoxide

Additive 4: tricresyl phosphate

Next, the following tests were carried out in respect to each of the above-described sample oils.

(Refrigerant Miscibility Test)

In accordance with "Refrigerant Miscibility Testing Method" of JIS-K-2211 "Refrigerating machine oil," 1 g of each of the sample oils was blended with 29 g of HFC 134a refrigerant to observe whether the sample oils and the refrigerant were miscible with each other at 0° C., or separate from each other or in the state of a white suspension. The results are shown in Tables 1–16.

(Electric Insulating Ability Test)

The volume resistivity at 25° C. of each of the sample oils was measured in accordance with JIS-C-2101 "Electric Insulating Oil Testing Method." The results are shown in Tables 1–16.

(Heat Stability/Hydrolysis Resistance Test I)

90 g of each of the sample oils wherein the water content had been adjusted to 1000 ppm were weighted and sealed in an autoclave together with 10 g of HFC 134a refrigerant and catalysts (iron, copper and aluminum wires), and subsequently heated at 200° C. Two weeks later, the appearances of the sample oils and the appearance of the catalysts were observed, and the volume resistivity of the sample oils and the total acid values of the sample oils were measured. The results are shown in Tables 1–7.

(Lubricity Test)

The sample oils were each applied to a test journal for measuring the amount of the test journal (pin) worn by having the test machine run in at a test oil temperature of 100° C. under a load of 150 lb for 1 minute and then run under a load of 250 lb for 2 hours in accordance with ASTM D 2670 "FALEX WEAR TEST."

The results of the measurement are shown in Tables 1–7.

(Heat Stability/Hydrolysis Resistance Test II)

90 g of each of the sample oils wherein the water content had been adjusted to 1000 ppm were weighted and sealed in an autoclave together with log of HFC 134a refrigerant and catalysts (iron, copper and aluminum wires), and subsequently heated at 200° C. 2000 hours later, the appearances of the sample oils and the appearance of the catalysts were observed, and the volume resistivity of the sample oils and the total acid values of the sample oils were measured. The results are shown in Tables 8–16.

(Heat Stability/Hydrolysis Resistance Test III)

In accordance with JIS K 2540, 30 g of each of the sample oils were put into a beaker and the beaker was capped with aluminum foil and stood still in a thermostat of 150° C. with a rotary plate attached thereto. Seven days later, the appearances, the viscosity and the total acid values of the sample oils were measured. The results are shown in Table 17.

TABLE 1

|  | Example 1 | Example 2 | Example 3 | Example 4 | Example 5 |
|---|---|---|---|---|---|
| (A) | 1 | 1 | 1 | 1 | 1 |
| (% by mass) | 50 | 50 | 50 | 50 | 50 |
| (B) | 7 | 8 | 9 | 10 | 11 |
| (% by mass) | 50 | 50 | 50 | 50 | 50 |
| Additive | — | — | — | — | — |

TABLE 1-continued

|  |  | Example 1 | Example 2 | Example 3 | Example 4 | Example 5 |
|---|---|---|---|---|---|---|
| (% by mass) |  |  |  |  |  |  |
| Kinematic | 40° C.(mm$^2$/s) | 14.2 | 16.8 | 21.7 | 20.3 | 22.2 |
| Viscosity | 100° C.(mm$^2$/s) | 2.6 | 2.7 | 3.5 | 3.3 | 3.5 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $1.2 \times 10^{14}$ | $3.8 \times 10^{14}$ | $5.8 \times 10^{14}$ | $6.6 \times 10^{14}$ |  |
| Heat Stability/ | Appearance of Sample Oil | No Change | No Change | No Change | No Change | No Change |
| Hydrolysis | Appearance of    Cu | No Change | No Change | No Change | No Change | No Change |
| Resistance | Catalyst         Fe | No Change | No Change | No Change | No Change | No Change |
| Test I |                  Al | No Change | No Change | No Change | No Change | No Change |
|  | Volume Resistivity(Ω · cm) | $2.0 \times 10^{13}$ | $3.3 \times 10^{13}$ | $1.1 \times 10^{13}$ | $1.0 \times 10^{13}$ | $2.8 \times 10^{13}$ |
|  | Total Acid Value(mgKOH/g) | 0.10 | 0.15 | 0.10 | 0.10 | 0.13 |
| FALEX Test | Amount of Journal Worn(mg) | 13 | 13 | 14 | 13 | 14 |

TABLE 2

|  |  | Example 6 | Example 7 | Example 8 | Example 9 | Example 10 |
|---|---|---|---|---|---|---|
| (A) |  | 1 | 1 | 1 | 2 | 3 |
| (% by mass) |  | 50 | 50 | 50 | 50 | 50 |
| (B) |  | 12 | 13 | 14 | 8 | 8 |
| (% by mass) |  | 50 | 50 | 50 | 50 | 50 |
| Additive |  | — | — | — | — | — |
| (% by mass) |  |  |  |  |  |  |
| Kinematic | 40° C.(mm$^2$/s) | 13.8 | 16.9 | 22.5 | 12.5 | 19.8 |
| Viscosity | 100° C. (mm$^2$/s) | 2.5 | 2.9 | 3.4 | 2.5 | 3.8 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $2.9 \times 10^{13}$ | $5.5 \times 10^{13}$ | $6.0 \times 10^{13}$ | $3.8 \times 10^{14}$ | $2.2 \times 10^{14}$ |
| Heat Stability/ | Appearance of Sample Oil | No Change | No Change | No Change | No Change | No Change |
| Hydrolysis | Appearance of    Cu | No Change | No Change | No Change | No Change | No Change |
| Resistance | Catalyst         Fe | No Change | No Change | No Change | No Change | No Change |
| Test I |                  Al | No Change | No Change | No Change | No Change | No Change |
|  | Volume Resistivity(Ω · cm) | $8.6 \times 10^{12}$ | $7.9 \times 10^{12}$ | $1.0 \times 10^{13}$ | $1.5 \times 10^{13}$ | $1.8 \times 10^{13}$ |
|  | Total Acid Value(mgKOH/g) | 0.18 | 0.15 | 0.17 | 0.15 | 0.12 |
| FALEX Test | Amount of Journal Worn(mg) | 15 | 14 | 15 | 13 | 13 |

TABLE 3

|  |  | Example 11 | Example 12 | Example 13 | Example 14 | Example 15 |
|---|---|---|---|---|---|---|
| (A) |  | 4 | 5 | 6 | 1 | 1 |
| (% by mass) |  | 50 | 50 | 50 | 49.9 | 49.5 |
| (B) |  | 8 | 8 | 8 | 8 | 8 |
| (% by mass) |  | 50 | 50 | 50 | 49.9 | 49.5 |
| Additive |  | — | — | — | 1 | 4 |
| (% by mass) |  |  |  |  | 0.2 | 1.0 |
| Kinematic | 40° C.(mm$^2$/s) | 23.6 | 17.5 | 24.8 | 16.8 | 16.1 |
| Viscosity | 100° C.(mm$^2$/s) | 3.9 | 3.7 | 4.3 | 2.7 | 2.7 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $4.3 \times 10^{14}$ | $2.1 \times 10^{14}$ | $5.2 \times 10^{14}$ | $2.5 \times 10^{13}$ | $1.5 \times 10^{13}$ |
| Heat Stability/ | Appearance of Sample Oil | No Change | No Change | No Change | No Change | No Change |
| Hydrolysis | Appearance of    Cu | No Change | No Change | No Change | No Change | No Change |
| Resistance | Catalyst         Fe | No Change | No Change | No Change | No Change | No Change |
| Test I |                  Al | No Change | No Change | No Change | No Change | No Change |
|  | Volume Resistivity(Ω · cm) | $1.5 \times 10^{13}$ | $1.0 \times 10^{13}$ | $1.2 \times 10^{13}$ | $1.0 \times 10^{13}$ | $2.0 \times 10^{12}$ |
|  | Total Acid Value(mgKOH/g) | 0.14 | 0.17 | 0.15 | 0.03 | 0.15 |
| FALEX Test | Amount of Journal Worn(mg) | 13 | 15 | 14 | 13 | 7 |

TABLE 4

|  |  | Comparative Example 1 | Comparative Example 2 | Comparative Example 3 | Comparative Example 4 | Comparative Example 5 |
|---|---|---|---|---|---|---|
| (A) (% by mass) | | — | — | — | — | — |
| (B) (% by mass) | | 7 / 100 | 8 / 100 | 9 / 100 | 10 / 100 | 11 / 100 |
| Additive (% by mass) | | — | — | — | — | — |
| Kinematic Viscosity | 40° C.(mm$^2$/s) | 12.5 | 18.2 | 28.5 | 25.6 | 29.5 |
| | 100° C.(mm$^2$/s) | 2.9 | 3.5 | 4.7 | 4.5 | 4.7 |
| Total Acid Value (mgKOH/g) | | 0.01 | 0.01 | 0.01 | 0.01 | 0.01 |
| Miscibility | | Miscible | Miscible | Miscible | Miscible | Miscible |
| Volume Resistivity(Ω · cm) | | $2.7 \times 10^{13}$ | $4.6 \times 10^{13}$ | $7.4 \times 10^{13}$ | $8.1 \times 10^{13}$ | $8.3 \times 10^{12}$ |
| Heat Stability/ Hydrolysis Resistance Test I | Appearance of Sample Oil | No Change | No Change | No Change | No Change | No Change |
| | Appearance of Catalyst  Cu | Less Glossy | Less Glossy | Less Glossy | Less Glossy | Less Glossy |
| | Fe | No Change | No Change | No Change | No Change | No Change |
| | Al | No Change | No Change | No Change | No Change | No Change |
| | Volume Resistivity(Ω · cm) | $5.4 \times 10^{12}$ | $6.3 \times 10^{12}$ | $2.2 \times 10^{13}$ | $2.8 \times 10^{13}$ | $3.1 \times 10^{12}$ |
| | Total Acid Value(mgKOH/g) | 0.60 | 0.74 | 0.52 | 0.56 | 0.63 |
| FALEX Test | Amount of Journal Worn(mg) | 22 | 23 | 25 | 23 | 22 |

TABLE 5

|  |  | Comparative Example 6 | Comparative Example 7 | Comparative Example 8 | Comparative Example 9 | Comparative Example 10 |
|---|---|---|---|---|---|---|
| (A) (% by mass) | | — | — | — | 1 / 100 | 2 / 100 |
| (B) (% by mass) | | 12 / 100 | 13 / 100 | 14 / 100 | — | — |
| Additive (% by mass) | | — | — | — | — | — |
| Kinematic Viscosity | 40° C.(mm$^2$/s) | 12.8 | 18.9 | 29.5 | 15.1 | 6.5 |
| | 100° C.(mm$^2$/s) | 2.8 | 3.6 | 4.7 | 2.1 | 1.8 |
| Total Acid Value (mgKOH/g) | | 0.01 | 0.01 | 0.01 | 0.00 | 0.00 |
| Miscibility | | Miscible | Miscible | Miscible | Phase Separation | Phase Separation |
| Volume Resistivity(Ω · cm) | | $3.1 \times 10^{12}$ | $6.1 \times 10^{12}$ | $6.3 \times 10^{12}$ | $2.9 \times 10^{15}$ | $2.8 \times 10^{15}$ |
| Heat Stability/ Hydrolysis Resistance Test I | Appearance of Sample Oil | No Change | No Change | No Change | No Change | No Change |
| | Appearance of Catalyst  Cu | Less Glossy | Less Glossy | Less Glossy | No Change | No Change |
| | Fe | No Change | Partially Blackened | Partially Blackened | No Change | No Change |
| | Al | No Change | No Change | No Change | No Change | No Change |
| | Volume Resistivity(Ω · cm) | $1.1 \times 10^{11}$ | $4.6 \times 10^{11}$ | $3.8 \times 10^{11}$ | $2.5 \times 10^{14}$ | $6.3 \times 10^{14}$ |
| | Total Acid Value(mgKOH/g) | 0.51 | 0.55 | 0.64 | 0.03 | 0.02 |
| FALEX Test | Amount of Journal Worm(mg) | 20 | 24 | 22 | 13 | 13 |

TABLE 6

|  |  | Comparative Example 11 | Comparative Example 12 | Comparative Example 13 | Comparative Example 14 | Comparative Example 15 |
|---|---|---|---|---|---|---|
| (A) (% by mass) | | 3 / 100 | 4 / 100 | 5 / 100 | 6 / 100 | — |
| (B) (% by mass) | | — | — | — | — | 15 / 100 |
| Additive (% by mass) | | — | — | — | — | — |
| Kinematic Viscosity | 40° C.(mm$^2$/s) | 21.6 | 29.5 | 16.9 | 31.1 | 68.7 |
| | 100° C.(mm$^2$/s) | 4.09 | 4.35 | 3.91 | 5.12 | 8.38 |
| Total Acid Value (mgKOH/g) | | 0.00 | 0.00 | 0.00 | 0.00 | 0.00 |
| Miscibility | | Phase Separation | Phase Separation | Phase Separation | Phase Separation | Miscible |
| Volume Resistivity(Ω · cm) | | $4.5 \times 10^{15}$ | $5.3 \times 10^{15}$ | $2.1 \times 10^{15}$ | $6.3 \times 10^{15}$ | $4.9 \times 10^{14}$ |

TABLE 6-continued

|  |  | Comparative Example 11 | Comparative Example 12 | Comparative Example 13 | Comparative Example 14 | Comparative Example 15 |
|---|---|---|---|---|---|---|
| Heat Stability/ Hydrolysis Resistance Test I | Appearance of Sample Oil | No Change | No Change | No Change | No Change | No Change |
|  | Appearance of Catalyst Cu | No Change | No Change | No Change | No Change | No Change |
|  | Fe | No Change | No Change | No Change | No Change | No Change |
|  | Al | No Change | No Change | No Change | No Change | No Change |
|  | Volume Resistivity($\Omega \cdot$ cm) | $8.7 \times 10^{14}$ | $1.0 \times 10^{14}$ | $1.5 \times 10^{14}$ | $5.7 \times 10^{14}$ | $4.2 \times 10^{13}$ |
|  | Total Acid Value(mgKOH/g) | 0.02 | 0.02 | 0.03 | 0.02 | 0.15 |
| FALEX Test | Amount of Journal Worn(mg) | 12 | 12 | 13 | 11 | 13 |

TABLE 7

|  |  | Comparative Example 16 | Comparative Example 17 | Comparative Example 18 | Comparative Example 19 |
|---|---|---|---|---|---|
| (A) (% by mass) |  | — | — | 8 50 | 8 50 |
| (B) (% by mass) |  | 16 100 | 17 100 | 16 50 | 17 50 |
| Additive (% by mass) |  | — | — | — | — |
| Kinematic Viscosity | 40° C.(mm²/s) | 31.6 | 65.6 | 25.0 | 42.1 |
|  | 100° C.(mm²/s) | 5.79 | 8.0 | 4.7 | 5.8 |
| Total Acid Value (mgKOH/g) |  | 0.00 | 0.02 | 0.01 | 0.01 |
| Miscibility |  | Miscible | Miscible | Miscible | Miscible |
| Volume Resistivity($\Omega \cdot$ cm) |  | $5.7 \times 10^{14}$ | $3.0 \times 10^{14}$ | $2.8 \times 10^{14}$ | $1.0 \times 10^{14}$ |
| Heat Stability/ Hydrolysis Resistance Test I | Appearance of Sample Oil | No Change | No Change | No Change | No Change |
|  | Appearance of Catalyst Cu | Less Glossy | No Change | Less Glossy | Less Glossy |
|  | Fe | Partially Blackened | No Change | No Change | Partially Blackened |
|  | Al | No Change | No Change | No Change | No Change |
|  | Volume Resistivity($\Omega \cdot$ cm) | $1.5 \times 10^{12}$ | $1.0 \times 10^{14}$ | $1.5 \times 10^{12}$ | $7.6 \times 10^{14}$ |
|  | Total Acid Value(mgKOH/g) | 0.30 | 0.20 | 0.75 | 0.15 |
| FALEX Test | Amount of Journal Worn(mg) | 12 | 18 | 17 | 20 |

TABLE 8

|  |  | Example 16 | Example 17 | Example 18 | Example 19 | Example 20 |
|---|---|---|---|---|---|---|
| (A) (% by mass) |  | 1 49.9 | 1 49.9 | 1 49.9 | 1 49.9 | 1 49.9 |
| (B) (% by mass) |  | 7 49.9 | 8 49.9 | 9 49.9 | 10 49.9 | 11 49.9 |
| Additive (% by mass) |  | 1 0.2 | 1 0.2 | 1 0.2 | 1 0.2 | 1 0.2 |
| Kinematic Viscosity | 40° C.(mm²/s) | 14.2 | 16.8 | 21.7 | 20.3 | 22.2 |
|  | 100° C.(mm²/s) | 2.6 | 2.7 | 3.5 | 3.3 | 3.5 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity($\Omega \cdot$ cm) |  | $1.0 \times 10^{13}$ | $2.5 \times 10^{13}$ | $5.0 \times 10^{13}$ | $5.8 \times 10^{13}$ | $1.0 \times 10^{13}$ |
| Heat Stability/ Hydrolysis Resistance Test II | Appearance of Sample Oil | No Change | No Change | No Change | No Change | No Change |
|  | Appearance of Catalyst Cu | Less Glossy | Less Glossy | Less Glossy | Less Glossy | Less Glossy |
|  | Fe | Partially Blackened | Partially Blackened | Partially Blackened | Partially Blackened | Partially Blackened |
|  | Al | No Change | No Change | No Change | No Change | No Change |
|  | Volume Resistivity ($\Omega \cdot$ cm) | $1.5 \times 10^{11}$ | $3.0 \times 10^{11}$ | $1.0 \times 10^{11}$ | $1.5 \times 10^{11}$ | $2.0 \times 10^{11}$ |
|  | Total Acid Value(mgKOH/g) | 0.85 | 0.90 | 0.95 | 0.85 | 0.90 |

TABLE 9

|  |  | Example 21 | Example 22 | Example 23 | Example 24 | Example 25 |
|---|---|---|---|---|---|---|
| (A) |  | 1 | 1 | 1 | 1 | 1 |
| (% by mass) |  | 49.9 | 49.9 | 49.9 | 49.9 | 49.9 |
| (B) |  | 7 | 8 | 9 | 10 | 11 |
| (% by mass) |  | 49.9 | 49.9 | 49.9 | 49.9 | 49.9 |
| Additive |  | 2 | 2 | 2 | 2 | 2 |
| (% by mass) |  | 0.2 | 0.2 | 0.2 | 0.2 | 0.2 |
| Kinematic | 40° C.(mm$^2$/s) | 14.2 | 16.8 | 21.7 | 20.3 | 22.2 |
| Viscosity | 100° C.(mm$^2$/s) | 2.6 | 2.7 | 3.5 | 3.3 | 3.5 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $1.0 \times 10^{13}$ | $2.0 \times 10^{12}$ | $5.0 \times 10^{13}$ | $5.0 \times 10^{13}$ | $1.0 \times 10^{13}$ |
| Heat Stability/ | Appearance of Sample Oil | No Change | No Change | No Change | No Change | No Change |
| Hydrolysis | Appearance of    Cu | No Change | No Change | No Change | No Change | No Change |
| Resistance | Catalyst    Fe | No Change | No Change | No Change | No Change | No Change |
| Test II |            Al | No Change | No Change | No Change | No Change | No Change |
|  | Volume Resistivity(Ω · cm) | $1.5 \times 10^{12}$ | $3.0 \times 10^{12}$ | $1.0 \times 10^{12}$ | $1.0 \times 10^{12}$ | $2.5 \times 10^{12}$ |
|  | Total Acid Value(mgKOH/g) | 0.30 | 0.45 | 0.35 | 0.30 | 0.35 |

TABLE 10

|  |  | Example 26 | Example 27 | Example 28 | Example 29 | Example 30 |
|---|---|---|---|---|---|---|
| (A) |  | 1 | 1 | 1 | 1 | 1 |
| (% by mass) |  | 49.9 | 49.9 | 49.9 | 49.9 | 49.9 |
| (B) |  | 7 | 8 | 9 | 10 | 11 |
| (% by mass) |  | 49.9 | 49.9 | 49.9 | 49.9 | 49.9 |
| Additive |  | 3 | 3 | 3 | 3 | 3 |
| (% by mass) |  | 0.2 | 0.2 | 0.2 | 0.2 | 0.2 |
| Kinematic | 40° C.(mm$^2$/s) | 14.2 | 16.8 | 21.7 | 20.3 | 22.2 |
| Viscosity | 100° C.(mm$^2$/s) | 2.6 | 2.7 | 3.5 | 3.3 | 3.5 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $1.0 \times 10^{13}$ | $2.0 \times 10^{13}$ | $4.5 \times 10^{13}$ | $5.0 \times 10^{13}$ | $1.2 \times 10^{13}$ |
| Heat Stability/ | Appearance of Sample Oil | No Change | No Change | No Change | No Change | No Change |
| Hydrolysis | Appearance of    Cu | No Change | No Change | No Change | No Change | No Change |
| Resistance | Catalyst    Fe | No Change | No Change | No Change | No Change | No Change |
| Test II |            Al | No Change | No Change | No Change | No Change | No Change |
|  | Volume Resistivity(Ω · cm) | $2.0 \times 10^{12}$ | $3.5 \times 10^{12}$ | $1.0 \times 10^{12}$ | $1.0 \times 10^{12}$ | $2.2 \times 10^{12}$ |
|  | Total Acid Value(mgKOH/g) | 0.40 | 0.45 | 0.40 | 0.35 | 0.35 |

TABLE 11

|  |  | Example 31 | Example 32 | Example 33 | Example 34 | Example 35 |
|---|---|---|---|---|---|---|
| (A) |  | 1 | 1 | 1 | 2 | 3 |
| (% by mass) |  | 49.9 | 49.9 | 49.9 | 49.9 | 49.9 |
| (B) |  | 12 | 13 | 14 | 8 | 8 |
| (% by mass) |  | 49.9 | 49.9 | 49.9 | 49.9 | 49.9 |
| Additive |  | 1 | 1 | 1 | 1 | 1 |
| (% by mass) |  | 0.2 | 0.2 | 0.2 | 0.2 | 0.2 |
| Kinematic | 40° C.(mm$^2$/s) | 13.8 | 16.9 | 22.5 | 12.5 | 19.8 |
| Viscosity | 100° C.(mm$^2$/s) | 2.5 | 2.9 | 3.4 | 2.5 | 3.8 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $5.5 \times 10^{12}$ | $4.8 \times 10^{12}$ | $5.5 \times 10^{12}$ | $1.0 \times 10^{13}$ | $10 \times 10^{13}$ |
| Heat Stability/ | Appearance of Sample Oil | No Change | No Change | No Change | No Change | No Change |
| Hydrolysis | Appearance of    Cu | Less Glossy | Less Glossy | Less Glossy | Less Glossy | Less Glossy |
| Resistance | Catalyst    Fe | No Change | No Change | No Change | No Change | No Change |
| Test II |            Al | No Change | No Change | No Change | No Change | No Change |
|  | Volume Resistivity(Ω · cm) | $3.6 \times 10^{11}$ | $4.0 \times 10^{11}$ | $1.0 \times 10^{11}$ | $1.0 \times 10^{11}$ | $7.5 \times 10^{10}$ |
|  | Total Acid Value(mgKOH/g) | 0.95 | 1.00 | 0.85 | 0.95 | 0.95 |

TABLE 12

|  |  | Example 36 | Example 37 | Example 38 | Example 39 | Example 40 |
|---|---|---|---|---|---|---|
| (A) |  | 1 | 1 | 1 | 2 | 3 |
| (% by mass) |  | 49.9 | 49.9 | 49.9 | 49.9 | 49.9 |
| (B) |  | 12 | 13 | 14 | 8 | 8 |
| (% by mass) |  | 49.9 | 49.9 | 49.9 | 49.9 | 49.9 |
| Additive |  | 2 | 2 | 2 | 2 | 2 |
| (% by mass) |  | 0.2 | 0.2 | 0.2 | 0.2 | 0.2 |
| Kinematic | 40° C.(mm²/s) | 13.8 | 16.9 | 22.5 | 12.5 | 19.8 |
| Viscosity | 100° C.(mm²/s) | 2.5 | 2.9 | 3.4 | 2.5 | 3.8 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $8.5 \times 10^{12}$ | $5.0 \times 10^{12}$ | $6.0 \times 10^{12}$ | $1.2 \times 10^{13}$ | $1.0 \times 10^{13}$ |
| Heat Stability/ | Appearance of Sample Oil | No Change | No Change | No Change | No Change | No Change |
| Hydrolysis | Appearance of   Cu | No Change | No Change | No Change | No Change | No Change |
| Resistance | Catalyst   Fe | No Change | No Change | No Change | No Change | No Change |
| Test II |   Al | No Change | No Change | No Change | No Change | No Change |
|  | Volume Resistivity(Ω · cm) | $5.0 \times 10^{12}$ | $2.5 \times 10^{12}$ | $2.0 \times 10^{13}$ | $1.5 \times 10^{13}$ | $2.5 \times 10^{13}$ |
|  | Total Acid Value(mgKOH/g) | 0.30 | 0.35 | 0.35 | 0.30 | 0.35 |

TABLE 13

|  |  | Example 41 | Example 42 | Example 43 | Example 44 | Example 45 |
|---|---|---|---|---|---|---|
| (A) |  | 1 | 1 | 1 | 2 | 3 |
| (% by mass) |  | 49.9 | 49.9 | 49.9 | 49.9 | 49.9 |
| (B) |  | 12 | 13 | 14 | 8 | 8 |
| (% by mass) |  | 49.9 | 49.9 | 49.9 | 49.9 | 49.9 |
| Additive |  | 3 | 3 | 3 | 3 | 3 |
| (% by mass) |  | 0.2 | 0.2 | 0.2 | 0.2 | 0.2 |
| Kinematic | 40° C.(mm²/s) | 13.8 | 16.9 | 22.5 | 12.5 | 19.8 |
| Viscosity | 100° C.(mm²/s) | 2.5 | 2.9 | 3.4 | 2.5 | 3.8 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity(Ω · cm) |  | $4.5 \times 10^{12}$ | $5.0 \times 10^{12}$ | $5.0 \times 10^{12}$ | $2.0 \times 10^{13}$ | $1.5 \times 10^{13}$ |
| Heat Stability/ | Appearance of Sample Oil | No Change | No Change | No Change | No Change | No Change |
| Hydrolysis | Appearance of   Cu | No Change | No Change | No Change | No Change | No Change |
| Resistance | Catalyst   Fe | No Change | No Change | No Change | No Change | No Change |
| Test II |   Al | No Change | No Change | No Change | No Change | No Change |
|  | Volume Resistivity(Ω · cm) | $1.5 \times 10^{12}$ | $1.0 \times 10^{12}$ | $1.0 \times 10^{12}$ | $1.5 \times 10^{12}$ | $1.8 \times 10^{12}$ |
|  | Total Acid Value(mgKOH/g) | 0.30 | 0.30 | 0.45 | 0.35 | 0.40 |

TABLE 14

|  |  | Example 46 | Example 47 | Example 48 |
|---|---|---|---|---|
| (A) |  | 4 | 5 | 6 |
| (% by mass) |  | 49.9 | 49.9 | 49.9 |
| (B) |  | 8 | 8 | 8 |
| (% by mass) |  | 49.9 | 49.9 | 49.9 |
| Additive |  | 1 | 1 | 1 |
| (% by mass) |  | 0.2 | 0.2 | 0.2 |
| Kinematic | 40° C.(mm²/s) | 23.6 | 17.5 | 24.8 |
| Viscosity | 100° C.(mm²/s) | 3.9 | 3.7 | 4.3 |
| Total Acid Value (mgKOH/g) |  | 0.01 | 0.01 | 0.01 |
| Miscibility |  | Miscible | Miscible | Miscible |
| Volume Resistivity (Ω · cm) |  | $1.0 \times 10^{13}$ | $2.0 \times 10^{13}$ | $4.5 \times 10^{13}$ |
| Heat Stability/ | Appearance of Sample Oil | No Change | No Change | No Change |
| Hydrolysis | Appearance of   Cu | Less Glossy | Less Glossy | Less Glossy |
| Resistance | Catalyst   Fe | No Change | No Change | No Change |
| Test II |   Al | No Change | No Change | No Change |
|  | Volume Resistivity(Ω · cm) | $1.0 \times 10^{11}$ | $2.5 \times 10^{11}$ | $1.5 \times 10^{11}$ |
|  | Total Acid Value(mgKOH/g) | 0.86 | 0.95 | 0.88 |

TABLE 15

|  |  | Example 49 | Example 50 | Example 51 |
|---|---|---|---|---|
| (A) |  | 4 | 5 | 6 |
| (% by mass) |  | 49.9 | 49.9 | 49.9 |
| (B) |  | 8 | 8 | 8 |
| (% by mass) |  | 49.9 | 49.9 | 49.9 |
| Additive |  | 2 | 2 | 2 |
| (% by mass) |  | 0.2 | 0.2 | 0.2 |
| Kinematic | 40° C.(mm²/s) | 23.6 | 17.5 | 24.8 |
| Viscosity | 100° C.(mm²/s) | 3.9 | 3.7 | 4.3 |
| Total Acid Value (mgKOH/g) |  | 0.01 | 0.01 | 0.01 |
| Miscibility |  | Miscible | Miscible | Miscible |
| Volume Resistivity(Ω · cm) |  | $1.5 \times 10^{13}$ | $1.2 \times 10^{13}$ | $3.0 \times 10^{13}$ |
| Heat Stability/ | Appearance of Sample Oil | No Change | No Change | No Change |
| Hydrolysis | Appearance of   Cu | No Change | No Change | No Change |
| Resistance | Catalyst        Fe | No Change | No Change | No Change |
| Test II |                 Al | No Change | No Change | No Change |
|  | Volume Resistivity(Ω · cm) | $2.5 \times 10^{12}$ | $1.5 \times 10^{12}$ | $1.2 \times 10^{12}$ |
|  | Total Acid Value(mgKOH/g) | 0.30 | 0.37 | 0.35 |

TABLE 16

|  |  | Example 52 | Example 53 | Example 54 |
|---|---|---|---|---|
| (A) |  | 4 | 5 | 6 |
| (% by mass) |  | 49.9 | 49.9 | 49.9 |
| (B) |  | 8 | 8 | 8 |
| (% by mass) |  | 49.9 | 49.9 | 49.9 |
| Additive |  | 3 | 3 | 3 |
| (% by mass) |  | 0.2 | 0.2 | 0.2 |
| Kinematic | 40° C.(mm²/s) | 23.6 | 17.5 | 24.8 |
| Viscosity | 100° C.(mm²/s) | 3.9 | 3.7 | 4.3 |
| Total Acid Value (mgKOH/g) |  | 0.01 | 0.01 | 0.01 |
| Miscibility |  | Miscible | Miscible | Miscible |
| Volume Resistivity(Ω · cm) |  | $1.5 \times 10^{13}$ | $1.5 \times 10^{13}$ | $5.0 \times 10^{13}$ |
| Heat Stability/ | Appearance of Sample Oil | No Change | No Change | No Change |
| Hydrolysis | Appearance of   Cu | No Change | No Change | No Change |
| Resistance | Catalyst        Fe | No Change | No Change | No Change |
| Test II |                 Al | No Change | No Change | No Change |
|  | Volume Resistivity(Ω · cm) | $1.0 \times 10^{12}$ | $1.5 \times 10^{12}$ | $1.5 \times 10^{12}$ |
|  | Total Acid Value(mgKOH/g) | 0.40 | 0.35 | 0.42 |

TABLE 17

|  |  | Example 55 | Example 56 | Example 57 | Example 58 |
|---|---|---|---|---|---|
| (A) |  | 1 | 1 | 1 | 1 |
| (% by mass) |  | 50 | 50 | 50 | 50 |
| (B) |  | 8 | 9 | 13 | 14 |
| (% by mass) |  | 50 | 50 | 50 | 50 |
| Additive |  | — | — | — | — |
| (% by mass) |  | — | — | — | — |
| Kinematic | 40° C.(mm²/s) | 16.9 | 22.5 | 16.8 | 21.7 |
| Viscosity | 100° C.(mm²/s) | 2.9 | 3.4 | 2.7 | 3.5 |
| Total Acid Value (mgKOH/g) |  | 0.01 | 0.01 | 0.01 | 0.01 |
| Heat Stability/ | Appearance of Sample Oil | No Change | No Change | No Change | No Change |
| Hydrolysis | 40° C. Kinematic | 17.6 | 23.6 | 19.5 | 24.8 |
| Resistance | Viscosity (mm²/s) |  |  |  |  |
| Test III | Total Acid Value(mgKOH/g) | 4.57 | 3.95 | 1.25 | 1.38 |

It is shown clearly by the results stated in Tables 1–17 that the sample oils in Examples 1 to 58 of the refrigerating machine oil compositions according to the present invention have the excellent and well-balanced performances including kinematic viscosity, refrigerant miscibility, electric insulating ability, hydrolysis resistance, heat stability and lubricity when it is used together with an HFC refrigerant.

Particularly, the sample oil in Example 14 containing an epoxy compound shows better heat stability/hydrolysis resistance and a smaller rise of the total acid value in the Heat Stability/Hydrolysis Resistance Test I compared with the sample oil in Example 2 not containing an epoxy compound.

Further the sample oil in Example 15 containing a phosphorus compound shows a smaller amount of journal worn in FALEX test thus having better wear resistance and load capacity compared with the sample oil in Example 2 not containing a phosphorus compound.

Further, the sample oils in Examples 21–25, 36–40 and 49–51 containing glycidyl ester epoxy compounds and the sample oils in Examples 26–30, 41–45 and 52–54 containing aliclyclic epoxy compounds show better results in Heat Stability/Hydrolysis Resistance Test II, namely, better heat stability and hydrolysis resistance compared with the sample oils in 16–20, 31–35 and 46–48 containing other epoxy compounds.

Further, the comparison between results of Heat Stability/Hydrolysis Resistance Test III of the sample oils in Example 55 and 56 each containing an ester compound having a cyclohexane ring and those of the sample oils in Examples 57 and 58 each containing an ester compound having a cyclohexene ring shows that the former ones have smaller rise of viscosity whereas the latter ones have smaller rise of total acid value.

As described above, the refrigerating machine oil composition according to the present invention does not only have excellent performances including lubricity, miscibility with refrigerants, heat stability/hydrolysis resistance, electric insulating ability and so on but can also realize high efficiency of a refrigerating system when the refrigerating machine oil composition is used together with HFC refrigerants or natural refrigerants such as carbon dioxide, hydrocarbons and so on.

What is claimed is:

1. A fluid composition for refrigerating machines comprising;
   (I) a refrigerating machine oil composition which comprises
      (a) a hydrocarbon oil, and
      (b) an alicyclic polycarboxylic acid ester compound having an alicyclic ring and at least two ester groups represented by formula —COOR$^1$ bonded to adjacent carbon atoms of the alicyclic ring, wherein R$^1$ represents a hydrocarbon group having 1–30 carbon atoms, and R$^1$ of each of the ester groups may be the same or different from each other; and
   (II) a refrigerant selected from a group consisting of hydrofluorocarbon refrigerants, fluorine-containing ether refrigerants, fluorine-free ether refrigerants and natural refrigerants.

2. A fluid composition according to claim 1, wherein said hydrocarbon oil is at least one oil selected from a group consisting of mineral oils, olefin polymers, naphthalene compounds and alkylbenzenes.

3. A fluid composition according to claim 1, wherein said hydrocarbon oil is an alkylbenzene.

4. A fluid composition according to claim 1, wherein said alicyclic polycarboxylic acid ester compound has two ester groups represented by said formula.

5. A fluid composition according to claim 1 further comprising an epoxy compound.

6. A fluid composition according to claim 5, wherein said epoxy compound is at least one compound selected from a group consisting of phenylglycidyl ether epoxy compounds, glycidyl ester epoxy compounds, alicyclic epoxy compounds and epoxidized fatty acid monoesters.

7. A fluid composition according to claim 5, wherein said epoxy compound is at least one compound selected from a group consisting of glycidyl ester epoxy compounds and alicyclic epoxy compounds.

8. A fluid composition according to claim 1 further comprising a phosphorus compound.

9. A fluid composition according to claim 1 wherein said hydrofluerocarbon refrigerant is chlorine-free.

10. A fluid composition according to claim 1 wherein a content of said hydrocarbon oil ranges from 5 to 95% by mass of the total amount of the refrigerating machine oil composition, and a content of said alicyclic polycarboxylic acid ester compound ranges from 5 to 95% by mass of the total amount of the refrigerating machine oil composition.

11. A fluid composition according to claim 1 wherein said alicyclic polycarboxylic acid ester compound is an ester of:
   an acid component selected from a group consisting of 1,2 cyclohexanedicarboxylic acid, 4-cyclohexene-1,2-dicarboxylic acid, 1-cyclohexene-1,2-dicarboxylic acid, 3-methyl-1,2 cyclohexanedicarboxylic acid, 4-methyl-1,2-cyolohexanedicarboxylic acid, 3-methyl-4-cyclohexene-1,2 dicarboxylic acid, 4-methyl-4-cyclohexene-1,2-dicarboxylic acid, 1,2,4-cyclohexene tricarboxylic acid, 1,2,4,5-cyclohexene tetracarboxylic acid and acid anhydrides thereof;
   and an alcohol component selected from a group consisting of straight chain alcohols having 3–18 carbon atoms, branched chain alcohols having 3–18 carbon atoms, and cycloalcohols having 5–10 carbon atoms.

12. A fluid composition according to claim 1, wherein an amount of said refrigerating machine oil composition ranges from 1 to 500 parts by weight per 100 parts by weight of the refrigerant.

* * * * *

UNITED STATES PATENT AND TRADEMARK OFFICE
CERTIFICATE OF CORRECTION

PATENT NO.   : 6,231,782 B1
DATED        : May 15, 2001
INVENTOR(S)  : Yuji Shimomura et al.

It is certified that error appears in the above-identified patent and that said Letters Patent is hereby corrected as shown below:

Column 30, claim 9,
Line 19, "hydrofluerocarbon" should read -- hydrofluorocarbon --.

Signed and Sealed this

Fourth Day of December, 2001

Attest:

NICHOLAS P. GODICI
Attesting Officer   Acting Director of the United States Patent and Trademark Office